March 8, 1960  E. H. MILLER  2,928,064
TEMPORARY POWER AND LIGHTING SYSTEM
Filed Aug. 12, 1957  3 Sheets-Sheet 2
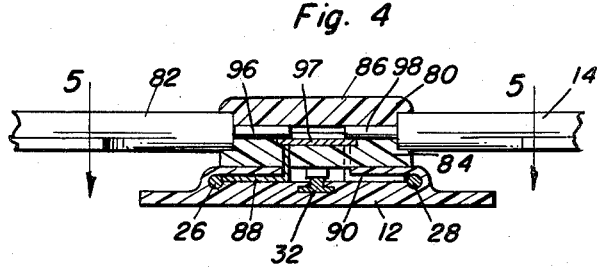
Fig. 4
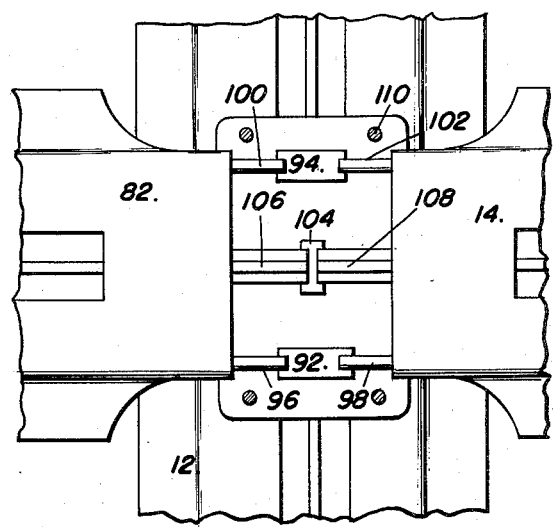
Fig. 5
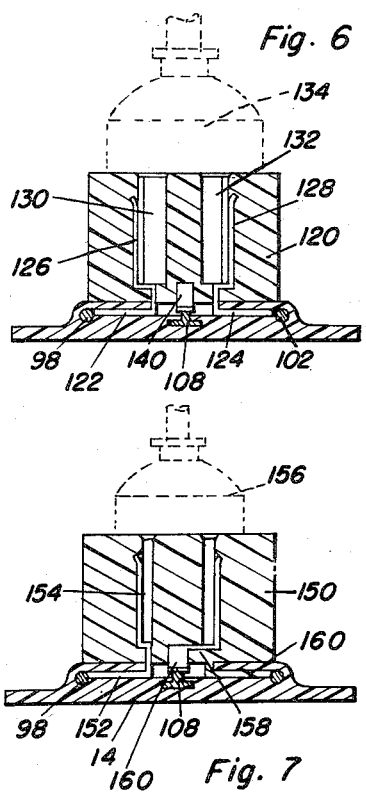
Fig. 6
Fig. 7
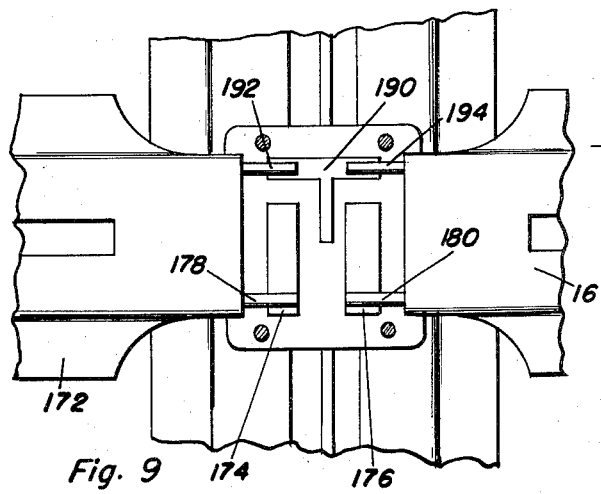
Fig. 9
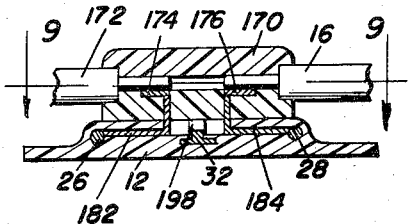
Fig. 8
Ervan H. Miller
INVENTOR.

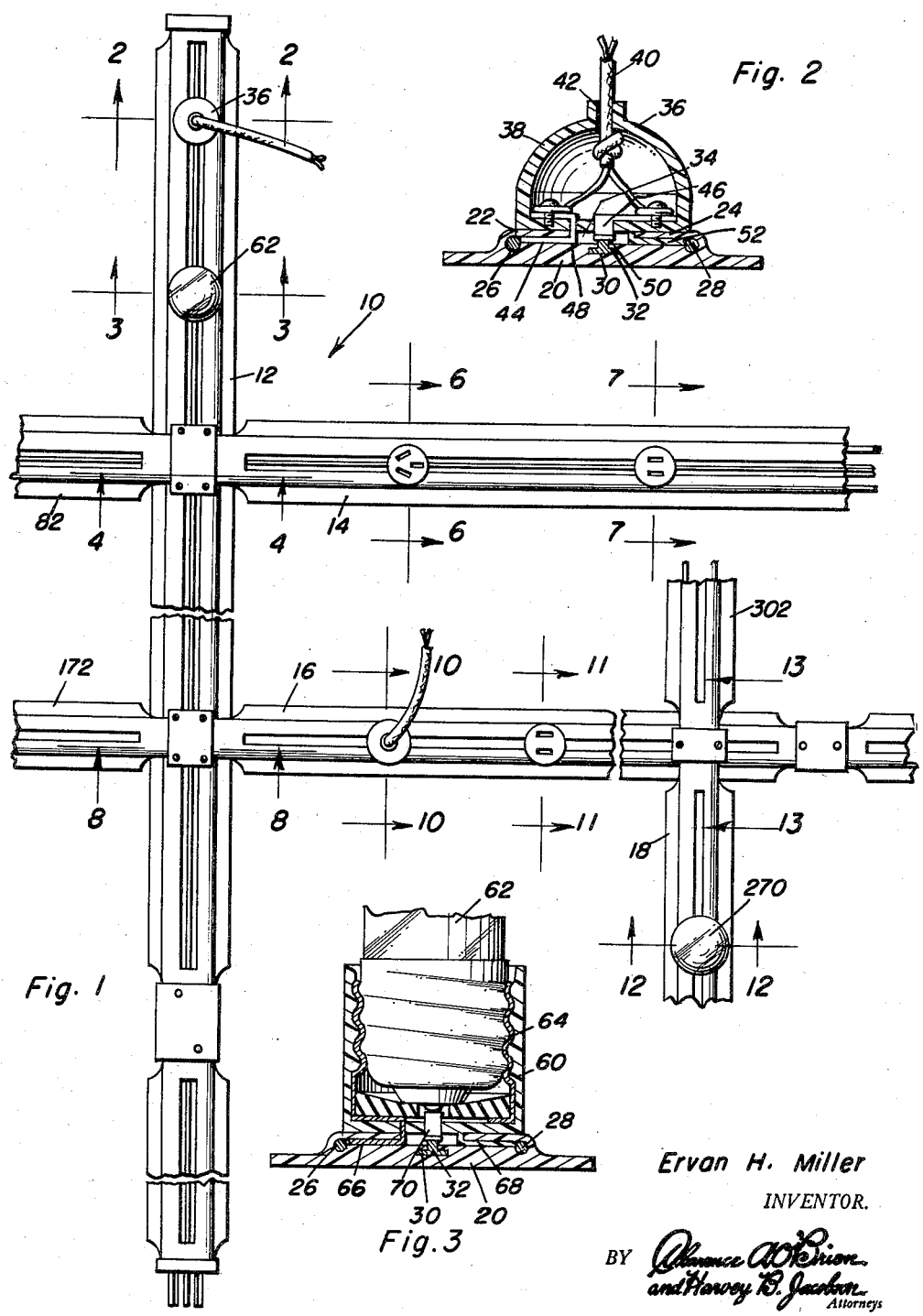

March 8, 1960  E. H. MILLER  2,928,064
TEMPORARY POWER AND LIGHTING SYSTEM
Filed Aug. 12, 1957  3 Sheets-Sheet 3

Ervan H. Miller
INVENTOR.

BY *Clarence A. O'Brien*
*and Harvey B. Jacobson*
Attorneys

United States Patent Office 2,928,064
Patented Mar. 8, 1960

2,928,064

TEMPORARY POWER AND LIGHTING SYSTEM

Ervan H. Miller, Spenard, Alaska

Application August 12, 1957, Serial No. 677,452

4 Claims. (Cl. 339—21)

This invention relates to an electrical distribution system and more particularly to a system adapted for temporary power and lighting and which is especially adapted to be used in a building during the construction thereof.

The primary object of the present invention resides in the provision of a system of electrical distribution where a temporary power and lighting system is needed.

In the construction of new buildings, it is often necessary to provide electrical power for lighting and for operation of power tools in various portions in the building. The concept of this invention includes the utilization of an elongated strip having conductors mounted therein and includes outlets mounted in the strip and slidable for substantial distances along the length of the strip or readily detachable therefrom and engageable in the strip whereby conventional electric plugs or terminals on power tubes or other conductors can be connected at convenient locations to the lighting and power system.

It is further within the principle of this invention to provide a temporary power and lighting system which can be used and reused and which is exceedingly flexible being adapted to carry both 110 volt and 220 volt current while being readily adaptable to have parts thereof eliminated or added in order to vary the use of the system as may be desired in a convenient manner.

Still further objects and features of this invention reside in the provision of an electrical distribution system which is simple in construction, relatively inexpensive to manufacture thereby permitting wide use, which when power is no longer needed at one place may be quickly and easily removed and replaced at any other point where needed, and which is safe and efficient in use.

These, together with the various ancillary objects and features of the invention which will become apparent as the following description proceeds are attained by this temporary power and lighting system, preferred embodiments of the invention being shown in the accompanying drawings, by way of example only, wherein:

Figure 1 is a plan view of a portion of the temporary power and lighting system comprising the present invention;

Figure 2 is an enlarged vertical transverse sectional detail view as taken along the plane of line 2—2 in Figure 1 illustrating a plug constructed in accordance with the concepts of the present invention as engaged with the conductors in one of the elongated strips used in the invention;

Figure 3 is a vertical transverse sectional detail view as taken along the plane of line 3—3 in Figure 1 illustrating the construction of an electrical lamp and a lamp socket therefor connected to the elongated strip;

Figure 4 is a vertical transverse sectional detail view on an enlarged scale as taken along the plane of line 4—4 in Figure 1 illustrating a cross over connection of a three wire electrical distribution arrangement;

Figure 5 is a vertical transverse sectional detail view as taken along the plane of line 5—5 in Figure 4 illustrating in particular the connections between the various conductors employed in Figure 4;

Figure 6 is a vertical transverse sectional detail view as taken along the plane of line 6—6 in Figure 1 illustrating a three wire socket adapted to be utilized in conjunction with the invention;

Figure 7 is an enlarged vertical transverse sectional view as taken along the plane of line 7—7 in Figure 1 illustrating a socket adapted to be used for a two prong connector;

Figure 8 is a vertical transverse sectional detail view as taken along the plane of line 8—8 in Figure 1 illustrating the connector used in connecting a two wire electrical distribution strip to a three wire electrical distribution strip;

Figure 9 is a vertical transverse sectional detail view on an enlarged scale as taken along the plane of line 9—9 in Figure 8;

Figure 10:
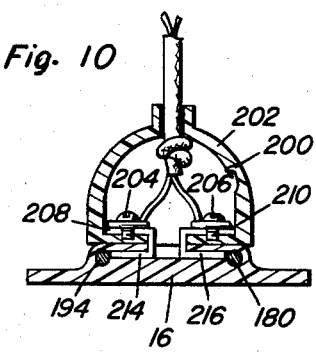
Figure 10 is an enlarged vertical transverse sectional detail view as taken along the plane of line 10—10 in Figure 1 illustrating a plug type connector connected to a two wire electrical distribution strip.

With continuing reference to the accompanying drawings wherein like reference numerals designate similar parts throughout the various views, reference numeral 10 generally designates a portion of an electrical distribution system adapted to be used for electrical power and lighting distribution and which includes a three wire electrical distribution strip as at 12, three wire and two wire electrical distribution strips as at 14 and 16 respectively, as well as another two wire electrical distribution strip 18 intersecting the electrical distribution strip 16. It is to be recognized that any suitable number of these electrical distribution strips may be employed as may be desired. The electrical distribution strips 12 include a body 20 of an electrically insulative material having a pair of flanges 22 and 24 integrally formed therewith and extending inwardly towards each other. Embedded in the junctures of the flanges 22 and 24 with the body 20 are non-insulated electrical conductors 26 and 28. These electrical conductors are at least partially embedded in the body and in communication with the space between the flanges 22 and 24 and the body 20 so that a plug when inserted between the flanges and the body may contact the conductors. The flanges in conjunction with the body 20 form an inverted T-shaped slot. There is also an inverted T-shaped groove 30 formed in the body 20 for reception of an inverted T-shaped elongated conductor 32 having a portion thereof projecting upwardly from the body 20 and into the slot 34 and between the flanges 22 and 24.

An electrical plug as at 36 may be connected to the strip 12 to provide electrical power to the conductors mounted therein or to connect other electrically operated devices to the electrical distribution system. This plug 36 includes an insulative body 38 of any suitable character having a conductor cable 40 passing inwardly through the neck 42 thereof. Mounted in the body 30 are a pair of contacts as at 44 and 46. One of the contacts which is of channel shape has an L-shaped prong 48 which is extendable into the T-shaped slot 34 and engageable with the conductor 26. The other of the contacts 46 is generally L-shaped in configuration and has a slide portion 50 engageable with the T-shaped conductor 32. In order to aid in holding the plug 36 in position, there is provided an L-shaped insulative prong 52 which is engageable beneath the flange 24 in the manner shown best in Figure 2. In order to position the plug 36, it is merely necessary to rotate it until the prongs 44 and 52 align with the slot 34. Then, the prongs may be depressed and the plug rotated rapidly until the prongs are properly seated.

Of course, when it is desired to supply electrical power to the strip 12, a three wire plug can be used having a prong that is electrically conductive in lieu of the insulative prong 52. The strip 12 may be of a flexible construction so that it can be used in locations requiring other than straight line arrangements as well as in linear arrangements.

In Figure 3 there is shown an electrical socket 60 for a lamp 62 for providing lighting. The socket 62 has an inner socket shell 64 that is electrically conductive and which is connected to a prong 66 engageable with the contact 26. An electrically insulative prong 68 is integrally formed with the main body of the socket and a contact 70 is carried by the body and engageable by the base of the lamp 62 and with the inverted T-shaped conductor 32.

Referring now to Figures 4 and 5 there will be seen an electrical connector 80 used in connecting to the three wire electrical distribution strip 12 three wire electrical distribution strips 82 and 14. The connector 80 includes a lower portion 84 and an upper or cap portion 86 and has embedded therein L-shaped prongs 88 and 90 which are engageable with the conductors 26 and 28 and which are connected to plates 92 and 94 engageable by the conductors 96, 98 and 100, 102, respectively. These conductors are the corresponding parts of the strips 82 and 14 to the conductors 26 and 28 of the strip 12. A generally H-shaped contact 104 is partially embedded in the lower portion 84 of the connector 80 and is engageable by the T-shaped conductors 106 and 108 of the strips 82 and 14 which correspond to the T-shaped conductor 32 of the strip 12. The cap is suitably recessed and apertured to overlie the various conductors and contacts and is held in place by suitable fasteners as at 110.

Referring now to Figure 6, there will be seen an electrical connector 120 having prongs of L-shape 122 and 124 connected to electrical contacts or integrally formed therewith as at 126 and 128 which extend into recesses 130 and 132 in the body of the connector 20 for receiving prongs from a plug 134 which may be of conventional construction. A contact 140 engages the T-shaped strip 108 and there is provided in conjunction therewith a recess for a prong from the plug 134. In Figure 7 there is shown a modified form of electrical connector 150 having a prong 152 which is electrically conductive and engageable with the contact 98 and extendable into a recess 154 for receiving a prong from a plug 156. The other contact 158 of the connector 150 has a contact portion 160 engageable with the T-shaped conductor 108. In order to hold the connector 150 securely in place the body of the connector has integrally formed therewith an insulative L-shaped prong 160 engageable beneath the flange of the strip 14.

In Figures 8 and 9 there is shown an electrical connector 170 for interconnecting the three wire electrical distribution strip to a pair of two wire electrical distribution strips 172 and 16. This connector 170 includes a pair of contact plates 174 and 176 engageable by the conductors 178 and 180, respectively, of the strips 172 and 16. The contact plates 174 and 176 have prongs of L-shape as at 182 and 184 which are engageable with the conductors 26 and 28. A substantially T-shaped plate 190 is engageable by the conductors 192 and 194 of the contact strips 172 and 16 and has a contact 198 engageable with the T-shaped conductor 32 of the strip 12.

Figure 11:
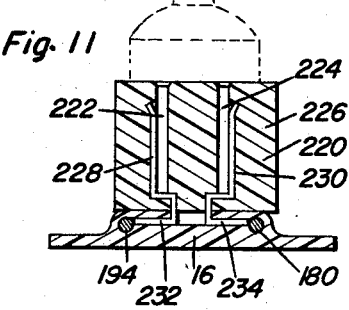
Figure 11 is a vertical transverse sectional detail view on an enlarged scale as taken along the plane of line 11—11 in Figure 1 illustrating a socket connected to a two wire electrical distribution strip.
Figure 12:
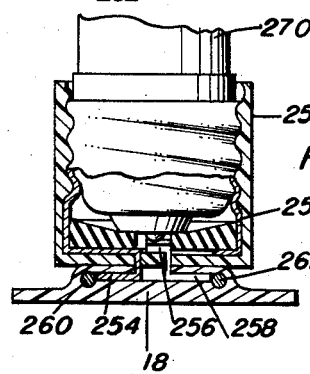
Figure 12 is a vertical transverse sectional detail view on an enlarged scale as taken along the plane of line 12—12 in Figure 1 illustrating a portion of a lamp and lamp socket connected to a two wire electrical distribution strip.

In Figure 10 there is shown a plug-in type electrical connector 200 having a body 202 of suitable plastic material and having fasteners 204 and 206 holding contacts 208 and 210 to the body 202 with the contacts including prongs of substantially L-shape 214 and 216 which are adapted to engage the conductors 194 and 180, respectively, of the strip 16. The plug-in type socket connector 220 shown in Figure 11 includes recesses 222 and 224 in the body 226 with contacts 228 and 230 including L-shaped prongs 232 and 234 adapted to contact the conductors 194 and 180 and hold the plug in place. The socket as shown at 250 in Figure 12 includes a contact shell 252 which is connected to an L-shaped prong 254 as well as a contact 256 which has an L-shaped prong 258 associated therewith which prongs engage the conductors 260 and 262, respectively, of the strip 18. A bulb or lamp 270 is adapted to be screwed into the socket for providing illumination.

Figure 14:
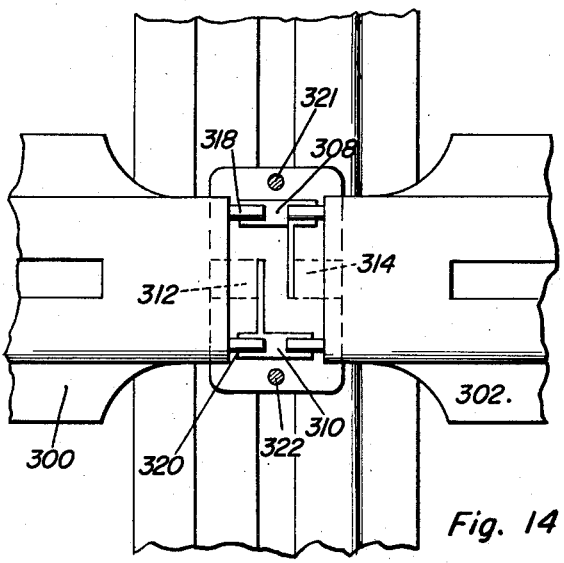
Figure 14 is an enlarged vertical transverse sectional detail view as taken along the plane of line 14—14 in Figure 13.
Figure 13:
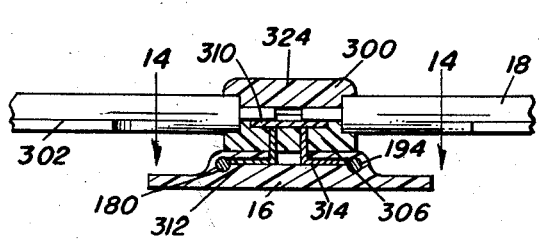
Figure 13 is a vertical transverse sectional detail view on an enlarged scale as taken along the plane of line 13—13 in Figure 1 illustrating an electrical connector for utilizing and connecting two two-wire electrical distribution strips.

In Figures 13 and 14 there is shown views of the electrical connector 300 utilized for interconnecting the strip 16 with the strip 18 and the strip 302. The connector 300 includes a body 306 having contacts in the form of plates 308 and 310 disposed therein the contacts having L-shaped prongs 312 and 314 depending therefrom and engageable with the conductors 180 and 194. The contact plates are engageable by the conductors 318 and 320 of the strips 300 and 302.

Pins, rivets or other means as at 321 and 322 are used to fasten the cap 324 of the fastener 300 to the body portion 306. Of course, bolts or the like may be employed.

Figure 15:
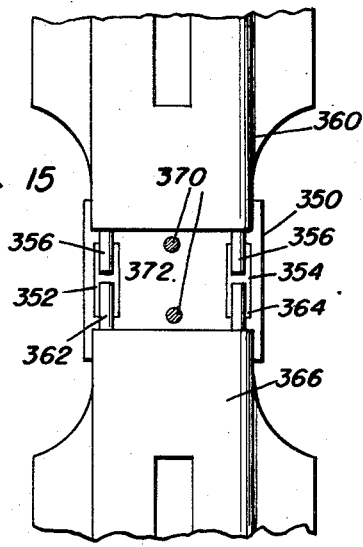
Figure 15 is a sectional detail view illustrating a modified form of connector for utilization in interconnecting two two-wire electrical distribution strips.

In Figure 15 there is shown a modified form of connector 350 having contact plates as at 352 and 354 utilized for interconnecting the conductors 356, 358 of a strip 360 and the conductors 362 and 364 of a strip 366. A cap, not shown, is held by means of fasteners as at 370 to the body 372 of the connector 350.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electrical power distribution system comprising an elongated strip of electrically insulative material having a body with a pair of integral upstanding flanges at its side edge, said upstanding flanges having integral inturned flanges at their upper edges extending towards each other in overlying relation to said body and providing therewith an inverted T-shaped slot, a pair of electrical conductors coextensive with said strip and partially embedded in the latter at the junctures of said upstanding flanges with said body, an inverted T-shaped conductor coextensive with said strip and between said pair of conductors and lying within said inverted T-shaped slot, an electrical connector having a pair of electrical contacts extending into said slot and electrically engaging two of said conductors, a pair of L-shaped outturned prongs carried by said body and depending therefrom for sliding reception in said slot and for retention beneath said inturned flanges, at least one of said L-shaped prongs comprising one of said electrical contacts.

2. The combination of claim 1 wherein one of said electrical contacts engages said inverted T-shaped conductor.

3. The combination of claim 1 wherein the other of said L-shaped prongs is of an electrically insulative material.

4. The combination of claim 1 including another elongated strip having an inverted T-shaped slot therein with a pair of conductive members in said slot, said conductive members being electrically connected to said pair of contacts.

References Cited in the file of this patent

UNITED STATES PATENTS

| | | |
|---|---|---|
| 2,076,558 | Hartman et al. | Apr. 13, 1937 |
| 2,274,136 | Frank et al. | Feb. 24, 1942 |
| 2,332,766 | Von Gehr | Oct. 26, 1943 |